United States Patent
Ji (10) Patent No.: US 7,994,670 B2
(45) Date of Patent: Aug. 9, 2011

(54) SYSTEMS, DEVICES, AND/OR METHODS FOR ROTATING A VEHICLE LAMP

(75) Inventor: Yingcun Ji, Beijing (CN)

(73) Assignee: Beijing Jingwei Hirain Technologies Co., Ltd., Beijing (CN)

( * ) Notice: Subject to any disclaimer, the term of this patent is extended or adjusted under 35 U.S.C. 154(b) by 437 days.

(21) Appl. No.: 12/260,113

(22) Filed: Oct. 29, 2008

(65) Prior Publication Data
US 2009/0196062 A1   Aug. 6, 2009

(30) Foreign Application Priority Data
Jan. 31, 2008  (CN) .......................... 2008 1 0006759

(51) Int. Cl.
*H02K 7/06* (2006.01)
(52) U.S. Cl. .......................................... 310/83; 362/524
(58) Field of Classification Search .................... 310/83, 310/89; 362/467, 524
See application file for complete search history.

(56) References Cited

U.S. PATENT DOCUMENTS

| | | | |
|---|---|---|---|
| 5,446,326 A * | 8/1995 | Scheider | 310/83 |
| 6,623,147 B2 | 9/2003 | Hayami | |
| 6,648,494 B2 | 11/2003 | Sugimoto | |
| 6,918,688 B2 | 7/2005 | Ishida | |
| 7,121,706 B2 * | 10/2006 | Takiguchi et al. | 362/524 |
| 7,291,951 B2 | 11/2007 | Takiguchi | |
| 7,548,001 B2 * | 6/2009 | Macaire | 310/71 |
| 2002/0064051 A1 * | 5/2002 | Sugimoto et al. | 362/467 |
| 2003/0169587 A1 * | 9/2003 | Uchida | 362/37 |
| 2006/0291230 A1 | 12/2006 | Tajima | |
| 2007/0040463 A1 * | 2/2007 | Zorweg et al. | 310/83 |
| 2007/0182259 A1 * | 8/2007 | Sakata et al. | 310/90 |
| 2007/0290570 A1 * | 12/2007 | Okada et al. | 310/261 |

FOREIGN PATENT DOCUMENTS
CN  1951723  10/2005

* cited by examiner

*Primary Examiner* — Nguyen N Hanh
(74) *Attorney, Agent, or Firm* — Michael Haynes PLC; Michael N. Haynes (57) ABSTRACT

In certain exemplary embodiments, an apparatus for rotating one or more vehicle lamps can include a case body, a motor, a printed circuit board, and/or a gear reducing mechanism. The motor can be mounted on the outside of the case body and/or can include a case shell and/or an end cover. The revolving shaft of the motor can be supported on the case shell and/or the end cover of the motor by a first bearing and/or a second bearing respectively. The end of the revolving shaft of the motor can enter into the case body and/or be fixed with a driving gear which can engage with the gear reducing mechanism. The output shaft of the gear reducing mechanism can actuate the vehicle lamp, so as to change the direction of irradiation of the vehicle lamp.

10 Claims, 5 Drawing Sheets

SYSTEMS, DEVICES, AND/OR METHODS FOR ROTATING A VEHICLE LAMP

CROSS-REFERENCES TO RELATED APPLICATIONS

This application claims priority to China Patent Application 200810006759.5, filed 31 Jan. 2008.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide an apparatus for vehicles, such as an apparatus for changing the direction of irradiation of one or more vehicle lamps corresponding to travel conditions, such as by rotating the one or more lamps.

An Adaptive Front-lighting System (hereafter AFS) can enhance the safety of driving at night, during conditions of partial to full darkness, and/or even during daylight, by changing the direction of irradiation of the vehicle lamp corresponding to the traveling conditions. Via various sensors, he AFS can detect travel conditions, such as vehicle speed, emergency braking, startup, climbing, and/or swerving, and then can input the signals of these sensors to an electronic control unit (hereafter ECU). After processing, the ECU can output a control signal to the vehicle lamp accuator and/or driving apparatus which can adjust the direction of irradiation of the vehicle lamp (for instance, the direction of irradiation in the horizontal and/or vertical direction of lamps, such as left and/or right headlamps, foglamps, directionals, taillamps, and/or brake lamps, etc.).

Figure 1:
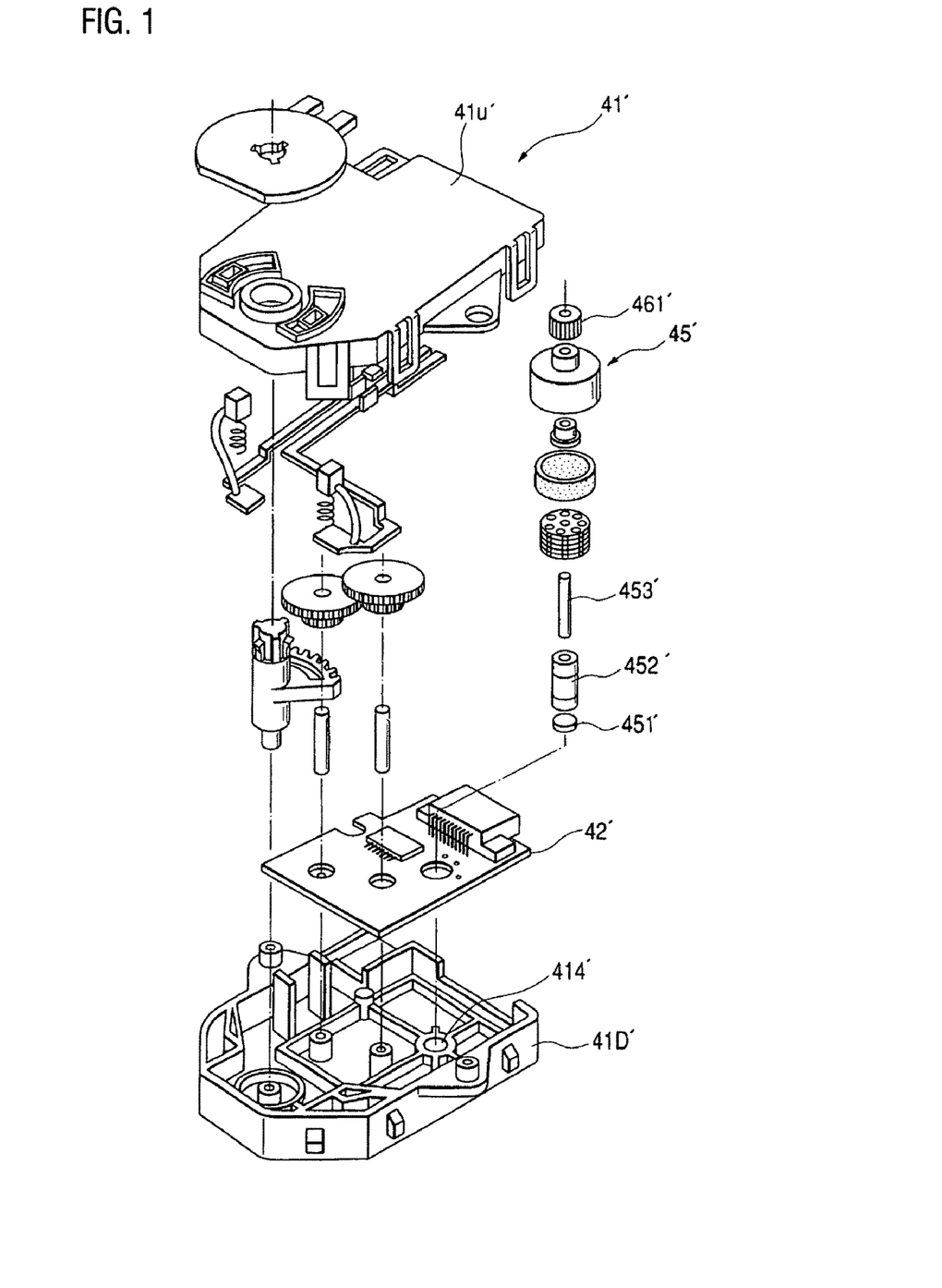
FIG. 1 and FIG. 2 show an exemplary rotary driving apparatus for a vehicle lamp.
Figure 2:
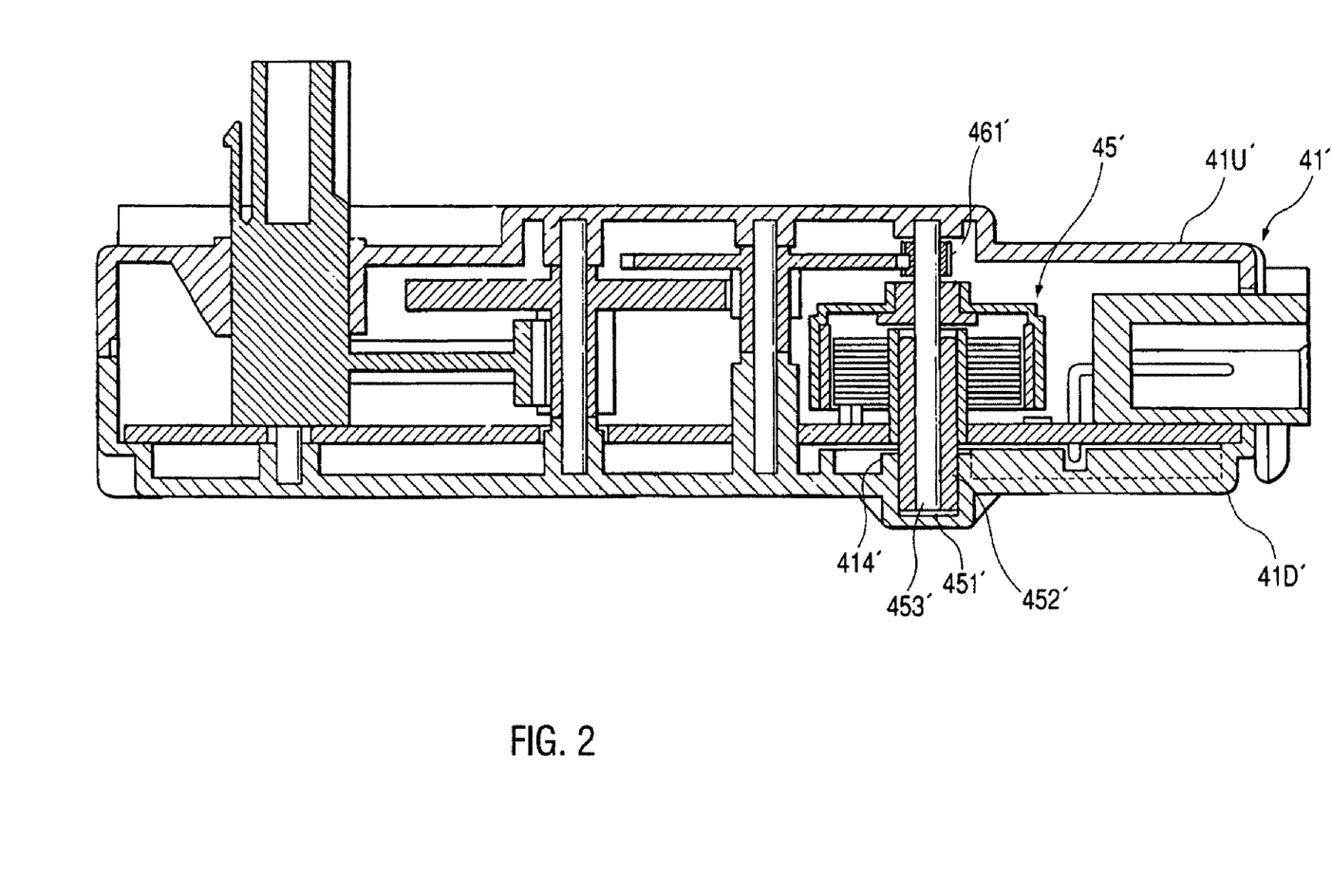

FIG. 1 and FIG. 2 show an exemplary driving apparatus of an AFS. A driving apparatus can include a case body 41' having an upper half case body 41U' and/or a lower half case body 41D'. A motor 45' can be accommodated in upper half case body 41U' and/or lower half case body 41D'. To ensure motor 45' rotates smoothly, the two ends of revolving shaft 453' of motor 45' can be supported respectively by the boss holes formed in the upper half case body 41U' and/or lower half case body 41D'. Because revolving shaft 453' can rotate at a high speed, a bearing sleeve 452' can be arranged on the end of revolving shaft 453' and/or a thrust bearing 451' can be accommodated in boss hole 414' for reducing wear of case body 41'. A driving gear 461' can be arranged on the other end of revolving shaft 453'. Based on signals received by the ECU (not shown) regarding travel conditions, such as those detected by sensors, the ECU can provide and/or send an output signal for changing the direction of irradiation of the vehicle lamp. Responsive to such an ECU output signal, motor 45' can drive the gear reducing mechanism via driving gear 461' to change the direction of irradiation of the vehicle lamp.

Motor 45' can be accommodated in case body 41', and case body 41' and motor 45' can be integrally designed. To reduce the wearing, a bearing sleeve 452' can be designed to fit different motors 45'.

Generally, the revolving shaft and the body case can be made of different materials. At high temperature, different degrees of deformation can occur due to the different degrees of thermal expansion, thereby the revolving shaft and the body case can become non-concentric, and this can affect the transmission efficiency, to the point that the revolving shaft can become locked by the body case. If the error of the body case and/or the motor exceeds a certain range, the revolving shaft of the motor can become eccentric when assembled, and/or the driving gear can fail to engage with the next stage gear well. In such situations, the wear of the gear can increase, the service life of the whole apparatus can be reduced, and/or undesirable noise can be generated.

Because motor 45' can be accommodated in case body 41', the heat dissipation of motor 45' can be affected. In addition, the electronic components (e.g., Hall elements) on printed circuit board 42', which can be accommodated in case body 41', can be influenced by the electromagnetic radiation interference of rotating motor 45'.

Figure 3:
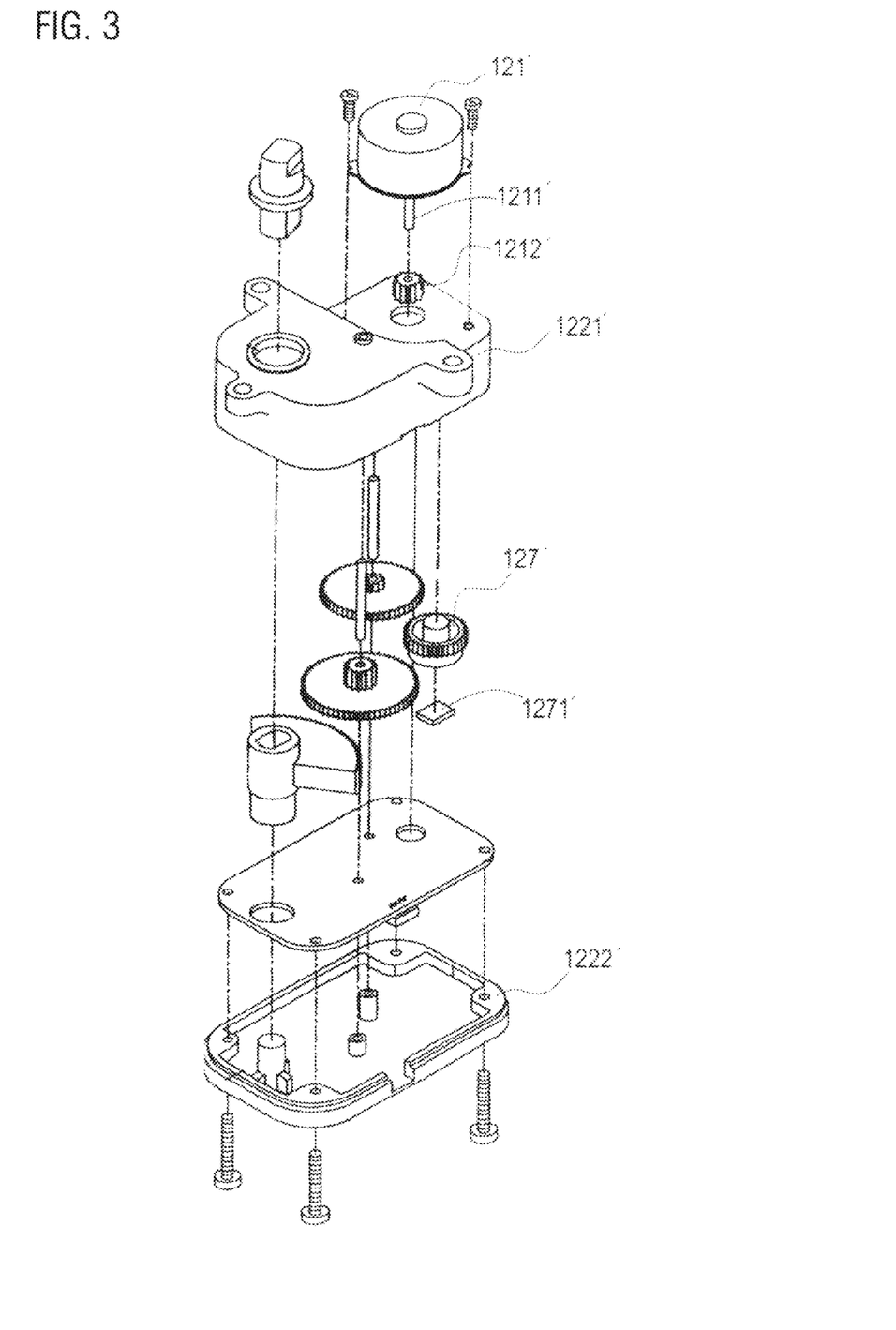
FIG. 3 shows the structure of an exemplary rotary driving apparatus for a vehicle lamp.

As shown in FIG. 3, a driving apparatus of an AFS can include a case body having an upper half case body and a lower half case body, and/or a motor 121' arranged outside of the case body. Motor 121' can include a motor shell and/or a fixed plate arranged on the bottom portion of the motor shell. Motor 121' can be fixed on the case body by screws. A driving gear 1212' can be arranged on the end of revolving shaft 1211' of motor 121'. Motor 121' can change the direction of irradiation of the vehicle lamp according a signal from the ECU (not shown) by rotating the gear reducing mechanism via driving gear 1212'. The driving apparatus also can have a printed circuit board. A magnetic inductive element can be provided on the printed circuit board for detecting the changes of the magnetic intensity of the magnet on the end gear. The small range of the revolving angle of the end gear can lead to a low detection sensitivity, so an auxiliary gear 127' with a magnet can be added in the gear reducing mechanism to solve this potential problem. The diameter of auxiliary gear 127' can be smaller than that of the end gear, so the rotational angle can be increased and/or the detection sensitivity can be enhanced.

As shown in FIG. 3, motor 121' can be arranged out of the case body, and/orcan be fixed on the case body directly by screws. As different components can be made by different manufacturers, misalignment and/or inclination of the revolving shaft caused by manufacturing error can occur during assembly of the motor, and/or the driving gear at the end of the revolving shaft of the motor can fail to properly engage the next gear, thereby significantly reducing the efficiency and/or service life of the AFS. Because motor 121' can be arranged out of the case body, so revolving shaft 1211' of motor 121' can create a cantilever structure during rotating of the driving gear, which can lead to uneven stress and/or eccentric, rough, and/or non-smooth rotatation.

Because the motor can be fixed on the case body by the fixed plate arranged on the bottom portion of the motor shell, the center of gravity of the motor can be on one side of the fixed plate. The gravity and the transmission force can concentrate on the joint of the motor shell and the fixed plate. But the joint might be not secure, for example the welding area of the joint might be loosened because of long term rotating of the motor, which can damage the smooth rotating of the motor and/or the reliability of the system.

Although the electromagnetic interference (EMI) from the motor on electrical elements provided in the printed circuit board can be reduced when the motor is arranged out of the case body, the EMI might not be inhibited thoroughly as the case body is usually made of the materials like plastic which typically are not electromagnetic shielding materials.

So it will likely prove useful to provide a vehicle lamp driving apparatus via which one or one more of the above-described potential challenges can be overcome.

Certain exemplary embodiments can provide a rotary driving apparatus for a vehicle lamp, which can improve the accuracy of the design, manufacture, and/or assembly of the components and/or reduce manufacturing costs.

Certain exemplary embodiments can provide a specially designed supporting hole, therefore the rotary driving apparatus need not be positioned by the revolving shaft of the motor. Thus accuracy requirements for the design, manufacture and assemblage of the case body can be lowered and/or the manufacturing cost can be reduced.

Certain exemplary embodiments can provide a rotary driving apparatus for a vehicle lamp, which can support the revolving shaft of the motor and/or solve one or more problems related to uneven stress, misalignment, and/or bumpy rotatation caused by the cantilever structure of the motor revolving shaft.

Certain exemplary embodiments can provide a rotary driving apparatus for a vehicle lamp that can avoid bumpy rotation of the revolving shaft and/or loosening of the motor on the case body.

Certain exemplary embodiments can provide a rotary driving apparatus for a vehicle lamp that can significantly reduce EMI generated by the rotating motor and/or imposed on the electrical elements of the printed circuit board.

Certain exemplary embodiments can provide a rotary driving apparatus for a vehicle lamp that can detect the motor position without installing any extra assistant gear and/or can reduce the cost of manufacture.

Certain exemplary embodiments can provide a rotary driving apparatus for a vehicle lamp, the apparatus comprising: a case body, a motor, a printed circuit board, and/or a gear reducing mechanism, wherein: an upper half case body and a lower half case body can be provided in the case body; the gear reducing mechanism and/or the printed circuit board can be accommodated between the upper half case body and the lower half case body; the motor can have a motor shell supported by a first bearing and/or a motor cover supported by a second bearing that can be located outside of the case body; the motor can provide room for a stator, a rotor, the first bearing, the second bearing, the motor cover, and/or a revolving shaft supported on the motor shell and/or the motor cover by the first bearing and the second bearing respectively; the motor can be fixed on the outside of the case body by the fixed ends of the motor shell; and/or the end of the revolving shaft can enter into the case body and/or connect with a driving gear that can engage with the gear reducing mechanism that can have an output shaft to actuate a vehicle lamp for changing the direction of irradiation of the vehicle lamp; etc.

The motor cover can be fixed on the motor shell, and/or the motor cover can be relatively fixed with the motor shell. The stator can be welded and/or bonded on the motor cove and/or can be fixed with the motor shell. The stator can be locked to the motor shell by the deformation of the motor shell. A via hole can be formed in the case body corresponding to the position of the revolving shaft of the motor. The diameter of the via hole can be larger than the external diameter of the driving gear.

The first bearing can be accommodated in a groove of the motor shell. The second bearing can accommodated in a groove of the motor cover. The first bearing and/or the second bearing can be a porous bearing.

A fixed flange can be arranged on the case body corresponding to the position of the motor. The motor shell can be locked on the outside of the fixed flange. At least one flange can be formed in the motor cover to clip into the corresponding positioning groove formed on the case body corresponding to the position of the flange.

A magnetic ring can be arranged on one of reduction gears in the gear reducing mechanism. At least one magnetic induction element can be arranged on the printed circuit board corresponding to the position of the magnetic ring to detect the motion of the motor. A grounding pin can be formed on the motor shell and/or can be grounded, so as to reduce the EMI to other electrical elements in the case body (like the magnetic induction element) when the motor is rotating.

A rotary driving apparatus for a vehicle lamp can comprise: a case body, a motor, a printed circuit board and/or a gear reducing mechanism, wherein: an upper half case body and/or a lower half case body are provided in the case body; the gear reducing mechanism and/or the printed circuit board can be accommodated between the upper half case body and the lower half case body; the motor can have a first bearing; a motor shell can be supported by the first bearing; a stator, a rotor, and/or a revolving shaft can be supported on the motor shell by the first bearing; the motor can be fixed on the outside of the case body by the fixed ends of the motor shell, which can have at least one grounding pin connected with the printed circuit board formed on the motor shell; and/or the end of the revolving shaft can enter into the case body and/or connect with a driving gear, which can engage with the gear reducing mechanism, which can have an output shaft to actuate a vehicle lamp for changing the direction of irradiation of the vehicle lamp; etc.

The motor can include a cover that can cover the motor shell. The other end of the revolving shaft can be supported on the motor cover by a second bearing. The two ends of the revolving shaft can be accommodated between the motor shell and the motor cover and/or can be supported by the bearings respectively. The motor cover and the motor shell can be fixed together. Therefore the revolving shaft of the motor need not be supported by the case body when the whole motor is fixed on the case body by the fixed ends of the motor shell. A via hole formed in the case body corresponding to the position of the revolving shaft can be a little larger and the supporting structure does not need to be located in the case body. Via certain exemplary embodiments, cost can be reduced and/or problems of misalignment and/or even locking of the revolving shaft caused by deformation of the case body can be avoided.

The revolving shaft can be supported by the bearings arranged in the motor shell and/or the motor cover, and/or the motor cover can be fixed with the motor shell, thus problems associated with uneven stress, misalignment, and/or bumpy rotation caused by the cantilever structure of the motor revolving shaft can be avoided. The motor shell can be fixed on the case body by the fixed ends, and/or the gravity and/or the transmission force of the motor stress can be dispersed on every joint with the motor shell. Thus, if the joints are firm, the motor can be fixed on the case body firmly. The motor can be positioned by the positioning fixed flange and/or the grooves instead of by changing the position of the fixed ends of the motor shell, so that assembly can be easier.

Figure 4:
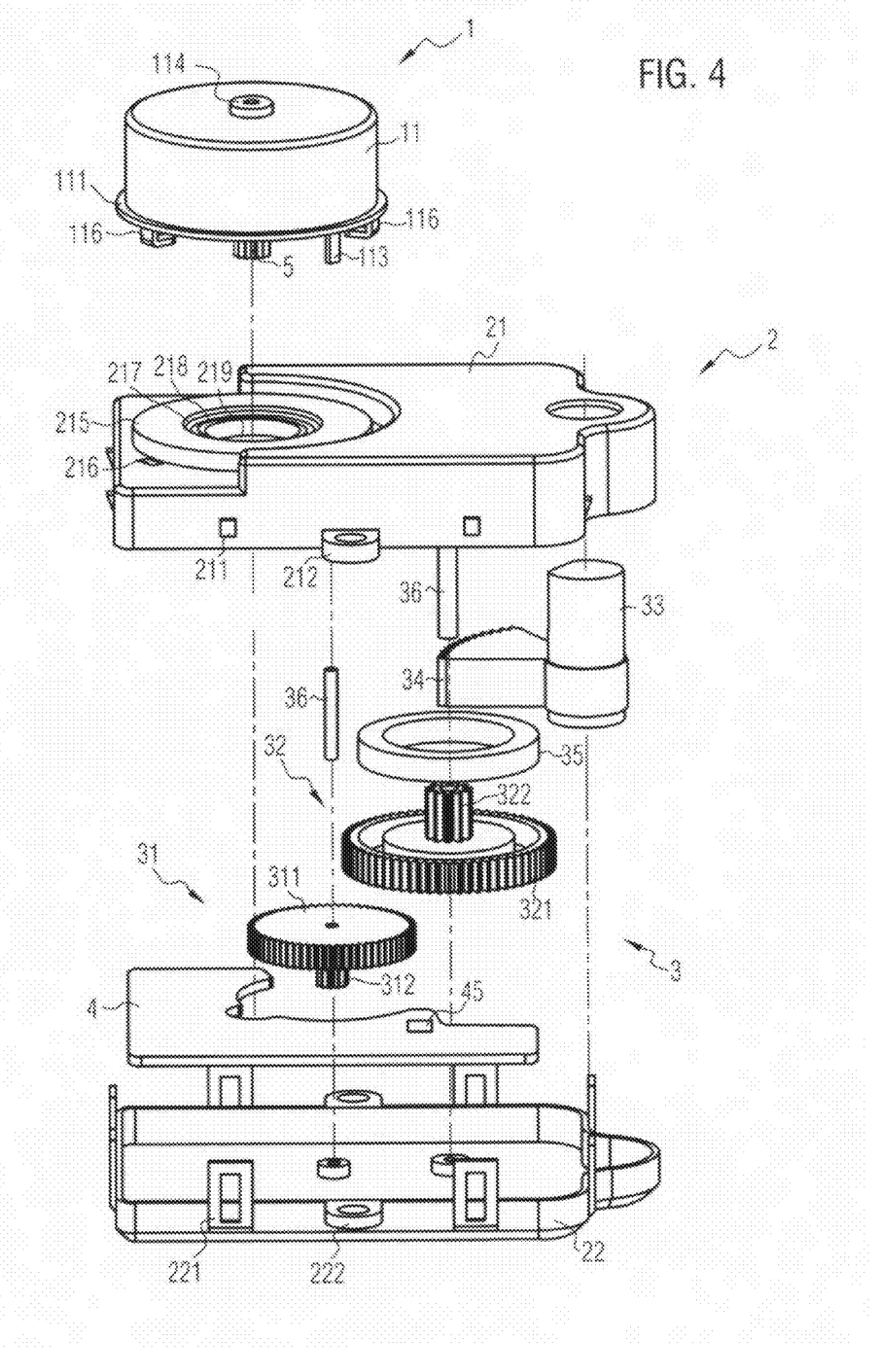
FIG. 4 is an exploded perspective view of an exemplary rotary driving apparatus of a vehicle lamp.

FIG. 4 is an exploded perspective view of an exemplary embodiment of a rotary driving apparatus for a vehicle lamp. As shown, this exemplary rotary driving apparatus can include a case body 2, a motor 1, a gear reducing mechanism 3, and/or a printed circuit board 4.

Case body 2 can comprise an upper half shell 21 and/or a lower half shell 22. Snap-fits 211 can be formed on upper half 21 and/or can engage with corresponding snap-fits 221 on lower half 22, so the two halves can be connected to each other. Upper half 21 and/or lower half 22 also can be connected by any other common connecting method. For example, a few lugs can be mounted on upper half 21 and/or lower half 22, and/or upper half 21 can be connected to lower half 22 by connecting the lugs with screws. Printed circuit board 4 and/or gear reducing mechanism 3 can be accommodated between upper half 21 and lower half 22.

Figure 5:
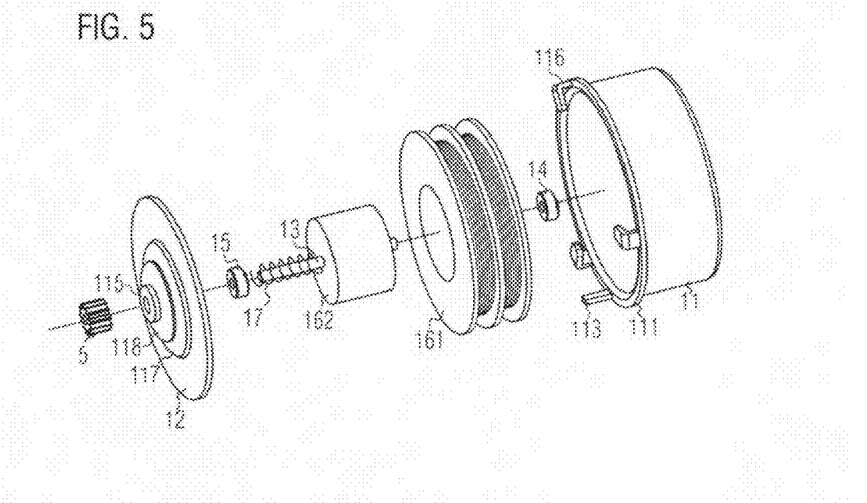
FIG. 5 is an exploded perspective view of an exemplary motor.
Figure 6:
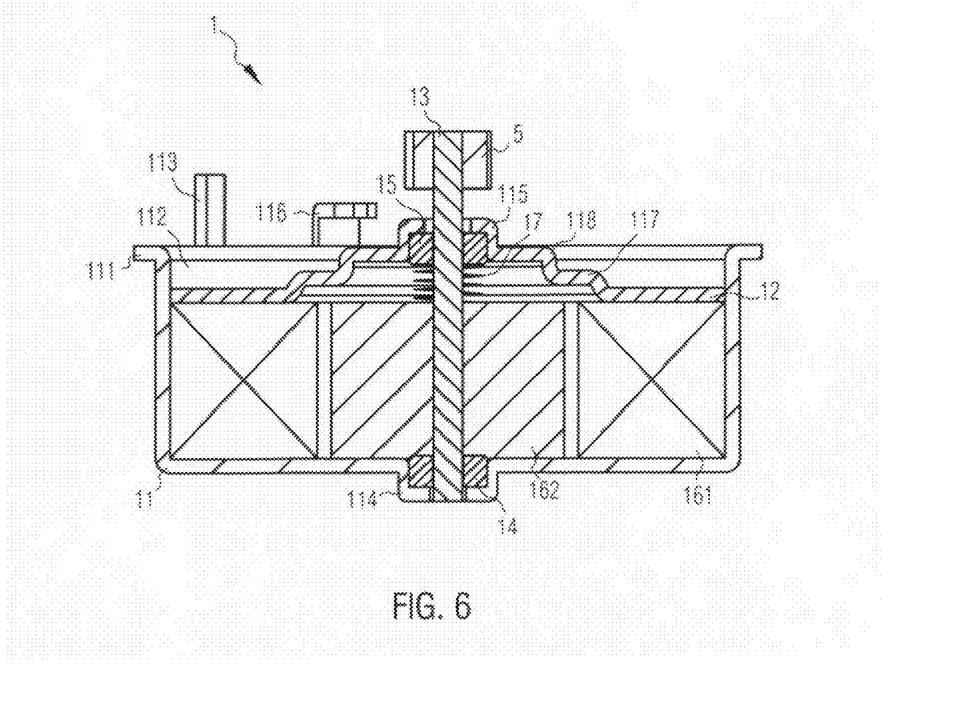
FIG. 6 is a cross section view of an exemplary motor.

Motor 1 can be arranged on the outside of case body 2 and/or motor 1 can be arranged on the outside of upper half 21. As shown in FIGS. 5 and 6, the end of the revolving shaft of motor 1 can enter into case body 2 and/or connect with driving gear 5. A via hole 219 in the case body 2 can correspond to the position of revolving shaft 13 of motor 1. The diameter of hole 219 can be larger than the external diameter of driving gear 5.

Gear reducing mechanism 3 can include a first stage reduction gear 31 and/or a second stage reduction gear 32. First stage reduction gear 31 can comprise a large gear 311 and/or a small gear 312 formed integrally with each other. Second stage reduction gear 32 can comprise a large gear 321 and/or a small gear 322 formed integrally with each other. Driving gear 5 can be arranged at the end of revolving shaft 13 and/or can engage with large gear 311 of first stage reduction gear 31. Small gear 312 of first stage reduction gear 31 can engage with large gear 321 of the second stage reduction gear 32. Small gear 322 of second stage reduction gear 32 can engage with sector gear 34, which can be formed integrally with output shaft 33. Thus, the rotation of motor 1 can be sequentially transmitted to first stage reduction gear 31, to second stage reduction gear 32, and/or to output shaft 33 via sector gear 34. Consequently, output shaft 33 can actuate the steering of a vehicle lamp to change its irradiation direction.

The revolving shaft of first stage reduction gear 31 can be supported and/or positioned by the supporting structure of lower half 22. The revolving shaft of second stage reduction gear 32 can be supported and/or positioned by the supporting structure of upper half 21. As shown in FIG. 4, when the revolving shaft of first stage reduction gear 31 and the revolving shaft of second stage reduction gear 32 respectively have a supporting axle 36 extruded from them, the supporting structure of the case body can be a round boss with supporting hole.

For convenient assembly, plackets can be opened on printed circuit board 4 corresponding to the position of driving gear 5, first stage reduction gear 31, second stage reduction gear 32 and/or output shaft 33.

As showing in FIG. 4, to detect the motion of motor 1, a magnetic ring 35 can be arranged on second stage reduction gear 32, and at least one magnetic induction element 45 can be arranged on printed circuit board 4 corresponding to the position of magnetic ring 35. Magnetic ring 35 can also be arranged on first stage reduction gear 31.

Motor 1 and/or case body 2 can be made in a modular design method by different manufacturers. For example, case body 2 and/or gear reducing mechanism 3 and/or other components in case body 2 can be made by professional injection mold manufacturers according to the design requirements, and/or motor 1 can be made by professional motor manufacturers according to the power requirements, rotational speed requirements, and/or the required mechanical dimensions and/or diameter of the revolving shaft 13, etc. For example, during assembly, the motor (including driving gear) can be assembled with the lower half case body first and then with the reducing gear and the printed circuit board, at last with the upper half case body. Alternatively, after they have been manufactured respectively, motor 1 and driving gear 5 can be assembled together as an independent component, and case body 2, printed circuit board 4, gear reducing mechanism 3, and/or output shaft 33, etc., can be assembled together as another independent component. Because the diameter of via hole 219 corresponding to the position of the revolving shaft 13 can be larger than the external diameter of the driving gear 5, motor 1 can be assembled on case body 2 conveniently without disassembling case body 2 first. Thus, the requirement of the accuracy for the design, manufacture, and machining of the components of the rotary driving apparatus of vehicle lamp can be lowered, thus the manufacture cost can be reduced.

Referring to FIGS. 5 and 6, the detail description of the structure of an exemplary embodiment of motor 1 will be explained.

Motor 1 can include a motor shell 11, a motor cover 12, a revolving shaft 13, a stator 161, a rotor 162, a spring 17, a first bearing 14, and/or a second bearing 15.

A fixing mechanism and/or a grounding pin 113 can be arranged in motor shell 11. The fixing mechanism can fix motor 1 on case body 2 entirely. The grounding pin 113 can connect the shell of motor 1 to the ground, so that the EMI from motor 1 to the other electrical elements (such as magnetic induction element 45) can be reduced and/or eliminated. The fixing mechanism can include flat fixed ends 116 fastened in the corresponding long narrow fixing holes 216, which can be a little larger than fixed ends 116. When motor 1 is fixed on upper half 21, their relative position can be changed to adjust to each other, thus requirements for the accuracy for the design, manufacture, and/or machining of case body 2 can be lowered, and/or the manufacturing cost of case body 2 can be reduced. Other connection mechanisms can be used to fix motor 1 on upper half case body 21, such as fixing motor shell 11 of motor 1 on upper half case body 21 by screws.

Motor cover 12 can be fixedly connected on motor shell 11 according to the following steps: assembling stator 161 in motor shell 11; applying force on several positions of motor shell 11 using thimble (not shown); producing deformation of motor shell 11; locking stator 161 in motor shell 11; welding and/or otherwise bonding motor cover 12 to stator 161; and/or connecting motor cover 12 and motor shell 11. In certain exemplary embodiments, motor cover 12 and motor shell 11 can be welded together. Motor cover 12 and motor shell 11 can be connected by any other method, for example motor cover 12 and motor shell 11 can be connected by an external thread in motor cover 12 and a corresponding internal thread in motor shell 11.

Revolving shaft 13 can be accommodated between motor shell 11 motor cover 12, and it can be supported on motor cover 12 by spring 17 which can be inserted through revolving shaft 13. first bearing 14 can be supported in a round groove 114 formed at the bottom portion of motor shell 11. second bearing 15 can be supported in a round groove 115 formed in motor cover 12 facing to the internal side. first bearing 14 and second bearing 15 can be a porous bearing or any other kind bearing suitable for motor, such as a thrust bearing. motor 1 can be a brushless motor such as stepper motor.

Motor 1 can be fixed on the outside of case body 2 with fixed ends 116, therefore, the external diameter of motor cover 12 can be a little smaller than the internal diameter of motor shell 11. In this case, the position of the connection of motor cover 12 and motor shell 11 can be lower than edges 111 of the motor shell 11, thus motor cover 12 can sink slightly into the motor shell 11. Meanwhile, a round fixed flange 215 can be arranged on case body 2 of the rotary driving apparatus corresponding to the position of motor 1. The diameter of fixed flange 215 can be a little smaller than the internal diameter of motor shell 11, so fixed flange 215 can just insert into a concave area 112 of motor cover 12, and motor shell 11 can be clipped on the outside of fixed flange 215 firmly (See FIG. 4). It can be advantageous to position motor 1 on the case body 2 by positioning fixed flange 215 and avoiding the misalignment of revolving shaft 13 during assembling. Of course, positioning fixed flange 215 is only one embodiment of positioning motor 1. In certain exemplary embodiments, one or more flanges can be formed in motor cover 12 of motor 1 and a supporting groove for second bearing 15 can be formed. A hole 219 can be formed on case body 2 corresponding to the position of the flange and/or can have a diameter little larger than the diameter of flange. Motor 1 can be positioned by clipping the flange into hole 219. In certain exemplary embodiments, two round step-like concentric flanges 117 and 118 can be formed in motor cover 12 while two corresponding grooves 217 and 218 can be formed in case body 2 of the rotary driving apparatus. If the flanges 117 and 118 are positioned into the corresponding grooves 217 and 218 respectively, motor 1 can be assembled and positioned precisely, and/or the misalignment of revolving shaft 13 can be avoided.

As is described above, the two ends of revolving shaft 13 can be supported by bearings 14, 15 and/or accommodated between motor shell 11 and motor cover 12, while motor shell 11 and motor cover 12 are fixed together. Therefore revolving shaft 13 of motor 1 is not necessarily supported by case body 2 when whole motor 1 is fixed on case body 2 by fixed ends 116. Thus, via hole 219 formed in case body 2 corresponding to the position of revolving shaft 13 can be a little larger and the supporting structure need not necessarily be located in case body 2. This approach can reduce and/or avoid costs and/or problems associated with misalignment or even locking of the revolving shaft 13 caused by the deformation of case body 2.

Because revolving shaft 13 can be supported by bearings 14, 15 arranged in the motor shell 11 and/or motor cover 12 respectively and/or motor cover 12 can be fixed with motor shell 11, problems associated with uneven stress, misalignment, and/or unsmooth rotatation of the motor caused by the cantilever structure revolving shaft can be avoided.

Because motor 1 can be fixed on case body 2 by fixed ends 116, the stress created by the gravity and/or the transmission forces of the motor can be dispersed on the joints with case body 2, so if the joints are firm, motor 1 can be firmly fixed on case body 2. The positioning structure can be arranged in motor cover 12 of motor 1 and case body 2 of the rotary driving apparatus, so the firmness and/or the positioning accuracy can be increased. Motor 1 can be positioned by positioning fixed flange 215 and/or grooves 217, 218 instead of by changing the position of fixed ends 116 of motor shell 11, thereby facilitating assembly.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. An apparatus for rotating a vehicle lamp comprising: a case body (2), a motor (1), a printed circuit board (4), and a gear reducing mechanism (3), wherein:

an upper half case body (21) and a lower half case body (22) are provided in the case body (2);

the gear reducing mechanism (3) and the printed circuit board (4) are accommodated between the upper half case body (21) and the lower half case body (22);

the motor (1) has a motor shell (11) supported by a first bearing (14) and a motor cover (12) supported by a second bearing (15), said motor located outside of the case body (2), said motor comprising a stator (161), a rotor (162), the first bearing (14), and the second bearing (15);

a revolving shaft (13) supported on the motor shell (11) and the motor cover (12) by the first bearing (14) and the second bearing (15) respectively, the motor (1) is fixed on the outside of the case body (2) by fixed ends (116) of the motor shell (11); and an end of the revolving shaft (13) enters into the case body (2) and connects with a driving gear (5) which engages with the gear reducing mechanism (3) having an output shaft (33) to actuate a vehicle lamp for changing the direction of irradiation of the vehicle lamp, wherein the gear reducing mechanism (3) comprises a first stage reduction gear (31), a second stage reduction gear (32) engaging with the first stage reduction gear (31), and a magnetic ring (35) arranged on the first stage reduction gear (31) or the second stage reduction gear (32), and at least one magnetic induction element (45) is arranged on the printed circuit board (4) corresponding to a position of the magnetic ring (35) to detect motion of the motor (1).

2. An apparatus for rotating a vehicle lamp comprising: a case body (2), a motor (1), a printed circuit board (4), and a gear reducing mechanism (3), wherein:
- an upper half case body (21) and a lower half case body (22) are provided in the case body (2);
- the gear reducing mechanism (3) and the printed circuit board (4) are accommodated between the upper half case body (21) and the lower half case body (22);
- the motor (1) has a motor shell (11) supported by a first bearing (14) and a motor cover (12) supported by a second bearing (15), said motor located outside of the case body (2), said motor comprising a stator (161), a rotor (162), the first bearing (14), and the second bearing (15);
- a revolving shaft (13) supported on the motor shell (11) and the motor cover (12) by the first bearing (14) and the second bearing (15) respectively,
- the motor (1) is fixed on the outside of the case body (2) by fixed ends (116) of the motor shell (11); and
- an end of the revolving shaft (13) enters into the case body (2) and connects with a driving gear (5) which engages with the gear reducing mechanism (3) having an output shaft (33) to actuate vehicle lamp for changing the direction of irradiation of the vehicle lamp, wherein the motor shell of the motor (1) is grounded by a grounding pin (113).

3. An apparatus for rotating a vehicle lamp comprising: a case body (2), a motor (1), a printed circuit board (4), and a gear reducing mechanism (3) wherein:
- an upper half case body (21) and a lower half case body (22) are provided in the case body (2);
- the gear reducing mechanism (3) and the printed circuit board (4) are accommodated between the upper half case body (21) and the lower half case body (22);
- the motor (1) comprises a first bearing (14), a motor shell (11) supported by the first bearing (14), a stator (161), a rotor (162), and a revolving shaft (13) supported on the motor shell (11) by the first bearing (14);
- the motor (1) is fixed on outside of the case body (2) by fixed ends (116) of the motor shell (11), and the motor shell has at least one grounding pin (113) connected with the printed circuit board (4) formed on the motor shell (11);
- a first end of the revolving shaft (13) enters into the case body (2) and connects with a driving gear (5) which engages with the gear reducing mechanism (3) which has an output shaft (33) adapted to actuate a vehicle lamp for changing a direction of irradiation of the vehicle lamp.

4. The apparatus according to claim 3, wherein the motor (1) comprises a motor cover (12) covering the motor shell (11) and supporting a second end of the revolving shaft (13) by the second bearing (15).

5. The apparatus according to claim 3, wherein the motor cover (12) of the motor (1) is fixedly connected on the motor shell (11).

6. The apparatus according to claim 3, wherein the stator (161) is bonded to the motor cover (12) and is fixed with the motor shell (11).

7. The apparatus according to claim 3, wherein a via hole (219) is formed in the case body (2) corresponding to a position of the revolving shaft (13) of the motor (1), and has a diameter larger than an external diameter of the driving gear (5).

8. The apparatus according to claim 3, wherein a fixed flange (215) adapted for locking the motor shell (11) is arranged on the case body (2) corresponding to a position of the motor (1).

9. The apparatus according to claim 3, wherein at least one flange (117, 118) formed in the motor cover (12) clips into at least one corresponding positioning groove (217, 218) formed in the case body (2).

10. The apparatus according to claim 3, wherein the gear reducing mechanism (3) comprises a first stage reduction gear (31), a second stage reduction gear (32) engaging with the first stage reduction gear (31), and a magnetic ring (35) arranged on the first stage reduction gear (31) or the second stage reduction gear (32), and at least one magnetic induction element (45) is arranged on the printed circuit board (4) corresponding to a position of the magnetic ring (35) to detect motion of the motor (1).

* * * * *